3,713,848
FLAVORING PROCESSES AND COMPOSITIONS INVOLVING BRANCHED-CHAIN ALKANETHIOLS
Ira Katz, Elberon, Richard A. Wilson, Edison, and Cynthia J. Mussinan, Bricktown, N.J., assignors to International Flavor & Fragrances Inc., New York, N.Y.
No Drawing. Filed Apr. 19, 1971, Ser. No. 135,337
Int. Cl. A23l 1/26
U.S. Cl. 99—140 R          7 Claims

ABSTRACT OF THE DISCLOSURE

Processes for altering the flavor of foodstuffs which comprise adding thereto at least one branched-chain alkanethiol having the formula;

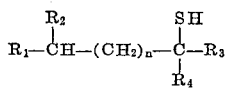

wherein $R_1$, $R_2$, $R_3$ and $R_4$ are the same or different alkyl groups or hydrogen, at least two of $R_1$, $R_2$, $R_3$ and $R_4$ being alkyl and at least one of $R_1$, $R_2$, $R_3$ and $R_4$ being hydrogen; and $n$ is 0 or 1, together with compositions incorporating such thiols for altering the flavor of foodstuffs.

BACKGROUND OF THE INVENTION

This invention relates to novel processes for altering the flavor and other organoleptic properties of foodstuffs by adding to such foodstuffs certain thiols as hereinafter described. The invention also contemplates flavor-altering compositions, as well as processes and compositions for altering the aroma properties of consumable materials.

The reproduction of meat and roasted meat and other roasted flavors and aromas has been the subject of a long and continuing search by those engaged in the production of foodstuffs. The acute shortage of foods, especially protein foods, in many parts of the world has given rise to a need for utilizing non-meat sources of protein and for making such protein as palatable and meat-like as possible. Accordingly, materials capable of closely simulating, improving, or even exactly reproducing the flavor and aroma of roasted products and meat products have long been sought.

While the aroma properties of alkyl mercaptans are notoriously familiar to chemists, the use of certain mercaptans and other sulfur-containing materials in foodstuffs is known. For example, allyl mercaptan has been used in spice flavors for soup and meat, n-butyl mercaptan has been used in vegetable soup flavors, and n-propyl mercaptan has been utilized in onion flavors.

Mercaptans such as thienyl mercaptan have been stated to have an odor faintly resembling coffee in extremely high dilutions. Moreover, recent work reported by Grey et al. in Chemical Abstracts 67, 20711u; Gumbmann et al. in Chemical Abstracts 61, 12552c; Brennan et al., Chemical Abstracts 61, 11247b; Merrit. Chemical Abstracts 61, 15260e; and Libbey et al., Chemical Abstracts 61, 1175b suggest the presence of unbranched thiols, respectively in chicken tissue, potato volatiles, canned beef headspace, irradiated foods and cheddar cheese volatiles. Ronald et al. in Chemical Abstracts 62, 6843f suggest the presence of primary and other thiols in oyster volatiles.

THE INVENTION

Briefly, it has now been found that certain branched-chain alkanethiols having the formula

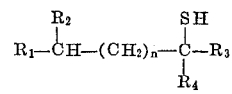

wherein $R_1$, $R_2$, $R_3$ and $R_4$ are the same or different alkyl groups or hydrogen, at least two of $R_1$, $R_2$, $R_3$ and $R_4$ being alkyl and at least one of $R_1$, $R_2$, $R_3$ and $R_4$ being hydrogen; and $n$ is 0 or 1 can be used to impart roasted flavor and aroma notes to consumable materials such as foodstuffs and the like. Certain of the alkanethiols according to this invention are particularly suited to the production of meat and roasted meat flavors and aromas in foodstuffs, and the lower alkyl groups contemplated in the formula given above are those having from one to three carbon atoms in the alkyl groups. These desirable alkyl groups can be methyl, ethyl, propyl, and isopropyl.

The alkanethiols according to the present invention are accordingly suited for use in processes which comprise adding a relatively small amount of the thiol or thiols to the foodstuff in an amount effective to alter the flavor and/or aroma properties of the foodstuff. The thiols are also well-suited to the production of flavoring compositions comprising in addition to the thiol or thiols, monosodium glutamate, sulfur-containing amino acids such as cysteine or the like, hydrolyzed protein materials such as hydrolyzed vegetable protein, hydrolyzed fish protein, and the like, or tetramethylpyrazine or a combination of two or more of such additional ingredients to provide a roasted meat flavor to proteinaceous and other products.

A particularly preferred thiol according to the present invention is 2-methyl-3-butanethiol, that is, the alkanethiol according to the above formula wherein $R_1$, $R_2$, and $R_3$ are methyl and $R_4$ is hydrogen and $n$ is zero. This compound, which is commercially available, has been discovered by us to have a powerful braised beef, roasted meat, pot roast aroma and taste, and to be a very potent flavor chemical. Another preferred alkanethiol according to the present invention is 2-methyl-1-butanethiol, that is, a thiol according to the formula given above wherein $R_1$ is ethyl, $R_2$ is methyl, $R_3$ and $R_4$ are hydrogen and $n$ is zero. This material has sweet and roasted aroma and flavor notes at levels somewhat above the threshold level, the character changing toward roasted meat and pot roast at higher usage levels.

An alkanethiol which can also be used in the present invention is 3-methyl-1-butanethiol, that is a thiol according to the formula given above wherein $R_1$ and $R_2$ are methyl, $R_3$ and $R_4$ are hydrogen, and $n$ is 1. At the 1 p.p.m. level in water this material has a rendered pork fat or chicken fat character which is suitable for pork, chicken, and fatty flavor notes in foodstuffs. A further alkanethiol is 2-methyl-2-propanethiol, that is, a material according to the above formula wherein $R_1$ and $R_2$ are hydrogen, $R_3$ and $R_4$ are methyl and $n$ is zero. A 1% ethanolic solution of this material has a sweet light fat, rendered pork aroma with character of roasted onions.

The taste in water at 1 p.p.m. has interesting meat flavor notes and an onion character. Another compound according to the formula given above wherein $R_1$ and $R_3$ are methyl, $R_2$ and $R_4$ are hydrogen, and $n$ is zero, is 2-butanethiol. A 1 p.p.m. solution in water has a boiled meat flavor character with onion notes which are useful in the formulation of meat gravy flavoring compositions.

Alkanethiols as utilized herein can be prepared by a number of reaction routes. One route which has proved to be effective is preparation of the thiol from the corresponding halo compound wherein the halo is chloro, bromo or iodo. The bromo compounds are generally preferred. The halo compound is reacted with thiourea or a substituted thiourea to provide the iso-thiuronium salt. This phase of the preparation is carried out at temperatures from about 60° C. to 100° C. and is preferably carried out at 70° C.–80° C. It is desirable to utilize a reaction vehicle, for instance, a glycol ether such as triethylene glycol and the like. The halo compound is preferably added slowly to the reaction vehicle containing the thiourea with continuous agitation.

After the first phase of the reaction is completed, a polyamine, such as tetraethylene pentamine, is added to cleave the iso-thiuronium salt and produce the alkanethiol corresponding to the haloalkane. The reaction with the amine is carried out under the same conditions of temperature and pressure and in the presence of the same reaction vehicles as are utilized for the first phase of the reaction. The pressures utilized can be subatmospheric or superatmospheric, but ordinary atmospheric pressures are generally desirable for preparing the alkanethiols.

It will be understood according to the present invention that the intermediate and the final products prepared herein can be neutralized, washed, and dried to purify and cleanse the desired substance. The alkanethiols can be obtained in purer form or in substantially pure form by conventional purification techniques. Thus, the intermediate and the product can be purified and/or isolated by distillation, extraction, crystallization, filtration, preparative chromatographic techniques, and the like.

It will be understood from the present description that the usage levels of the alkanethiols are controlled to provide the desirable flavor and aroma properties to foodstuffs and other consumable materials. Thus, the materials can be utilized in foodstuffs from their threshold levels which are on the order of 0.0005 p.p.m. (parts per million) up to levels where the effect of the alkanethiol becomes overwhelming and unbalances the flavor properties of the composition. All parts, percentages, proportions, and ratios herein are by weight unless otherwise stated.

It will be appreciated from the present disclosure that the alkanethiols according to the present invention can be used to alter, vary, fortify, modify, enhance, or otherwise improve the flavor of a wide variety of materials which are ingested, consumed, or otherwise organoleptically sensed.

The term "alter" in its various forms will be understood herein to mean the supplying or imparting a flavor character or more to an otherwise bland, relatively tasteless substance, or augmenting an existing flavor characteristic where the natural flavor is deficient in some regard, or supplementing the existing flavor impression to modify organoleptic character.

The alkanethiols and mixtures thereof are accordingly useful in flavoring compositions. A flavoring composition is taken to mean one which contributes a part of the overall flavor impression by supplementing or fortifying a natural or artificial flavor in a material as well as one which supplies substantially all the flavor and/or aroma character to a consumable article.

The term "foodstuff" as used herein includes both solid and liquid ingestible materials for man or animals, which materials usually do, but need not, have nutritional value. Thus, foodstuffs include meats, gravies, soaps, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like. It will be understood by those skilled in the art that the alkanethiols can be used to impart roasted and meat flavor notes to foodstuffs as aforementioned whenever such notes are desired.

When the alkanethiols of this invention are used in a flavoring composition, they can be combined with convenional flavoring materials or adjuvants. Such coingredients or flavoring adjuvants are well known in the art for such use and have been extensively described in the literature. Apart from the requirement that any such adjuvant material be ingestibly acceptable, and thus nontoxic or otherwise non-deleterious, conventional materials can be used and broadly include other flavor materials, vehicles, stabilizers, thickeners, surface active agents, conditioners and flavor intensifiers.

Such conventional flavoring materials include saturated, unsaturated, fatty, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, pyrazines and the like or derivatives thereof; other sulfur-containing materials including thiols, sulfides, including furyl sulfides, disulfides, thiazoles, and the like; proteins; hydrolyzed protein materials such as hydrolyzed vegetable protein, hydrolyzed fish protein, and the like; cystine and cysteine reaction products with thiamin and other such materials and the like; lipids; carbohydrates; so-called flavor potentiators such as monosodium glutamate, guanylates, and inosinates; natural flavoring materials; essential oils and extracts; artificial flavoring materials; and the like.

Stabilizers include preservatives such as sodium chloride, and the like, antioxidants such as calcium and sodium ascorbate, ascorbic acid, butylated hydroyanisole, butylated hydroxytoluene, propyl gallate, and the like, sequestrants such as citric acid, ethylenediamine tetracetic acid, phosphates, and the like.

Thickeners include materials such as carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches, and pectins.

Surface active agents include emulsifying agents such as mono- and/or diglycerides of fatty acids such as capric acid, caprylic acid, palmitic acid, stearic acid, oleic acid, myristic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements including iron salts such as ferric phosphate, ferric pyrophosphate, ferrous gluconate and the like, riboflavin, vitamins, zinc sources such as zinc chloride, zinc sulfate, and the like.

The alkanethiol or mixtures or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The thiols can be incorporated with the carriers by conventional means such as spray-drying, drum-drying, and the like. Such carriers can also include materials for coacervating the thiols of the present invention (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the alkanethiol can be added to the materials to be flavored at any convenient point in the production of the finished product. Thus, when the alkanethiol is used to alter or otherwise vary the flavor of a foodstuff, it can be added in the original mixture, dough, emulsion, batter, or the like prior to any cooking or heating operation. Alternatively, it can be added at a later stage of processing if volatilization losses would be excessive during the earlier processing. The quantity of alkanethiol utilized should be sufficient to impart the desired roasted or meat flavor characteristic to the product, but on the other hand, the use of an excessive amount of such alkanethiols is not only wasteful and uneconomical, but too large a quantity unbalances the flavor of the product consumed. Moreover, at too high a level in flavoring compositions (and also in foodstuffs) the roasted character of the alkanethiols will be lost.

The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is accordingly highly desirable that the ultimate compositions contain from about 0.005 part per million (p.p.m.) to about 5.0 p.p.m. of the thiol or thiols. More particularly, in food compositions it is preferred to use from about 0.01 to about 1.0 p.p.m. The higher usage levels up to about 0.9 p.p.m. are of veterinary products, such as dog food and the like.

The amount of alkanethiol to be utilized in flavoring compositions can be varied over a wide range depending upon a particular quality to be added to the foodstuff or other consumable material. Thus, amounts of the thiol according to the present invention from about 0.1 percent up to 80 or 90 percent can be incorporated in such compositions.

It is generally found to be desirable to include from about 0.5 to about 25 percent of the thiol in such compositions.

The following examples serve to illustrate embodiments of the invention as it is now preferred to practice it. It will be understood that these examples are illustrative and the invention is to be considered restricted thereto only as indicated in the appended claims.

Example I.—Preparation of 2-methyl-1-butanethiol

A one-liter flask fitted with a magnetic stirrer, a thermometer, a dropping funnel and a 14-inch glass helix-packed column having a variable reflux stillhead is charged with 125 ml. of triethylene glycol and 83.8 g. of thiourea, the temperature is raised to 75° C., and 100 g. of 2-methyl-1-bromobutane is added dropwise with stirring. After the bromobutane addition is complete, the reaction mixture is stirred for an additional 15 minutes at 75° C., and 94.6 g. of tetraethylene pentamine is added through the dropping funnel. The reaction product is stirred for an additional hour at 75° C.

The two-phase reaction product is transferred to a separatory funnel, and the lower layer is drawn off and discarded. Gas chromatography of the upper layer shows peaks corresponding to the mercaptan and the monosulfide. The upper layer is dissolved in 500 ml. of 4 N potassium hydroxide, and the layer is then extracted thrice with 80 ml. volumes of diethyl ether to remove the monosulfide and other impurities.

The resulting aqueous mixture is acidified with hydrochloric acid and extracted with ether to remove the mercaptan. The ether extract is dried over sodium sulfate and concentrated on a rotary evaporator. The concentrate so obtained is chromatographed on a 5% Carbowax TPA-terminated column, and peaks corresponding to the ether and 2-methyl-1-butanethiol are found.

GC (gas chromatographic) analysis indicates that the 11 g. of material obtained is 99.395% pure, and the structure is confirmed by infrared (IR) and nucelar magnetic resonant (NMR) spectroscopy. The methylbutanethiol so prepared has sweet, roasted flavor notes redolent of roasted nuts at the 0.0001% level in ethanol. At the 0.0005 p.p.m. level it has a strong roasted aroma and a roasted meat, pot roast taste; at 0.001 p.p.m., it has a very characteristic roasted aroma. In sugar water the roasted meat notes are somewhat depressed. It is suitable for roasted flavor notes in meat, nuts, caramel, and vegetable flavors. Its threshold level is below 0.0001 p.p.m.

Example II

A 0.1% solution in propyleneglycol of the methylbutanethiol produced in Example 1 is prepared, and a powdered shaker composition is prepared with the following formulation:

| Ingredient: | Amount (g.) |
|---|---|
| Ham spices | 2.5 |
| Monosoduim glutamate, fine grind | 2.5 |
| Salt, fine grind | 55.0 |
| Solution of thiol prepared above | 0.02 |

When the powdered material is used on ham, it is found that the ham flavor is enhanced and improved. (An alcoholic solution can be similarly used.)

Example III

A beef noodle soup mix concentrate is prepared by admixing the following ingredients:

| Ingredient: | Amount (g.) |
|---|---|
| Salt | 5.00 |
| Aqueous solution of 3-methyl-2-butanethiol (0.1%) | 0.03 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

The foregoing composition is made into bouillon-type cubes weighing from 4 to 5 grams. When one cube is dissolved in 6 ounces of boiling water a soup having excellent, rich, meat broth flavor is obtained.

Similar results are obtained when 2-methyl-1-butanethiol is substituted for the aforementioned 3-methyl material.

Example IV

A gravy flavor composition is prepared by admixing the following ingredients:

| Ingredient: | Amount (g.) |
|---|---|
| Corn starch | 10.50 |
| Ethanolic solution of 2-methyl-1-butanethiol (0.1%) | 0.03 |
| Ethanolic solution of 3-methyl-2-butanethiol (0.1%) | 0.03 |
| Caramel color | 0.30 |
| Garlic powder | 0.05 |
| White pepper | 0.05 |
| Salt | 1.92 |
| Monosodium glutamate | 0.20 |

The foregoing composition is added to 100 g. of water and brought to a boil. The resulting gravy has an excellent pot roast flavor.

Example V

Cysteine hydrochloride in the amount of 8.8 g. is refluxed at 125° F. under atmospheric pressure for four hours with a mixture of 309 g. of hydrolyzed vegetable protein and 674 g. of water. Subsequent to the reflux, the mixture is cooled and 8.8 g. of 4-methyl-5-(beta-hydroxyethyl) thiazole and 0.08 g. of 2-methyl-2-propanethiol are added and intimately admixed with the refluxed composition. The mixture so obtained has an excellent roast beef flavor.

What is claimed is:

1. A process for flavoring a foodstuff which comprises adding thereto a small amount of a substantially pure form of at least one branched-chain alkane thiol having the formula

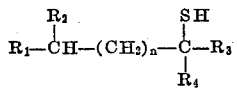

wherein $R_1$, $R_2$, $R_3$, and $R_4$ are the same or different alkyl groups having 1 to 3 carbon atoms or hydrogen, at least two of $R_1$, $R_2$, $R_3$ and $R_4$ being said alkyl, and either or both of $R_2$ and $R_4$ being said alkyl, and at least one of $R_1$, $R_2$, $R_3$ and $R_4$ being hydrogen; and $n$ is 0 or 1, effective to alter the flavor of the foodstuff.

2. A process according to claim 1 wherein $R_1$, $R_2$ and $R_3$ are methyl, $R_4$ is hydrogen and $n$ is zero.

3. A process according to claim 1 wherein $R_1$ is ethyl, $R_2$ is methyl, $R_3$ and $R_4$ are each hydrogen, and $n$ is zero.

4. A process according to claim 1 wherein $R_1$ and $R_2$ are methyl, $R_3$ and $R_4$ are hydrogen, and $n$ is 1.

5. A process according to claim 1 wherein $R_3$ and $R_4$ are methyl, $R_1$ and $R_2$ are hydrogen, and $n$ is zero.

6. A process according to claim 1 wherein there is additionally added at least one of monosodium glutamate, hydrolyzed protein, or tetramethylpyrazine as a meat-flavoring ingredient.

7. A flavor-altering composition which comprises a mixture of a substantially pure form of a branched-chain alkanethiol having the formula:

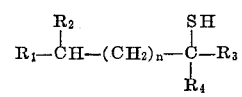

wherein $R_1$, $R_2$, $R_3$ and $R_4$ are the same or different alkyl groups having from one to three carbon atoms or hydrogen, at least two of $R_1$, $R_2$, $R_3$ and $R_4$ being said alkyl, and either or both of $R_2$ and $R_4$ being said alkyl, and at least one of $R_1$, $R_2$, $R_3$ and $R_4$ being hydrogen; and $n$ is 0 or 1, and a meat flavoring ingredient which is at least one of monosodium glutamate, hydrolyzed protein, or tetramethylpyrazine, and an edible carrier or vehicle for the mixture.

References Cited

Ronald et al.: Chemical Abstracts, 62:6843(f) (1965).

MORRIS O. WOLK, Primary Examiner

W. BOVEE, Assistant Examiner